(12) United States Patent
Renardy

(10) Patent No.: US 12,368,461 B2
(45) Date of Patent: Jul. 22, 2025

(54) RADIO FREQUENCY RECEIVER AND OPERATION METHOD THEREOF

(71) Applicant: Rohde & Schwarz GmbH & Co. KG, Munich (DE)

(72) Inventor: Paul Renardy, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 14 days.

(21) Appl. No.: 18/327,655

(22) Filed: Jun. 1, 2023

(65) Prior Publication Data

US 2024/0030951 A1 Jan. 25, 2024

(30) Foreign Application Priority Data

Jul. 21, 2022 (EP) .................................. 22186146

(51) Int. Cl.
 *H04B 1/16* (2006.01)
(52) U.S. Cl.
 CPC ..................... *H04B 1/16* (2013.01)
(58) Field of Classification Search
 CPC .. G06F 17/15; H04B 1/00; H04B 1/10; H04B 1/16; H04B 1/18; H04B 1/26; H04B 1/40; H04B 1/0025; H04B 1/0057; H04B 7/06; H04B 7/08; H04B 7/10; H04B 7/0456; H04L 7/04; H04L 27/00; H04L 27/06; H04L 27/26; H04N 5/50; H04N 7/12
 (Continued)

(56) References Cited

U.S. PATENT DOCUMENTS

| 3,936,182 A | 2/1976 | Sheikh |
| 3,993,948 A | 11/1976 | Epstein |

(Continued)

FOREIGN PATENT DOCUMENTS

| CA | 1064135 A | 10/1979 |
| CA | 3 139 187 A1 | 5/2022 |

(Continued)

OTHER PUBLICATIONS

Extended European Search Report issued in EP 22186146.1-1206 by the European Patent Office on Jan. 11, 2023.

*Primary Examiner* — Shawkat M Ali
(74) *Attorney, Agent, or Firm* — Studebaker Brackett PLLC

(57) ABSTRACT

This disclosure relates to a radio frequency receiver for performing uninterrupted observation of all signals within an operating frequency range. The receiver includes an antenna(s), a splitter(s) to receive an analog input signal from the antenna(s) and to split the analog input signal into at least two analog signals corresponding to at least two frequency bands within an operating frequency range of the receiver, and a signal conversion block operably coupled to the splitter(s), to receive the at least two analog signals simultaneously or quasi-simultaneously. The signal conversion block includes analog-to-digital converters configured to digitize the respective at least two analog signals, thereby generating at least two digitized signals. The signal conversion block includes digital down converters respectively coupled to the analog-to-digital converters, to operate on at least one of the at least two frequency bands and further to down convert the respective at least two digitized signals.

12 Claims, 6 Drawing Sheets

(58) Field of Classification Search
USPC ........ 341/143, 155; 375/219, 240, 260, 267, 375/316, 325, 340, 350
See application file for complete search history.

(56) References Cited

U.S. PATENT DOCUMENTS

| | | | |
|---|---|---|---|
| 4,270,174 | A | 5/1981 | Karlin et al. |
| 4,449,193 | A | 5/1984 | Tournois |
| 4,523,190 | A | 6/1985 | De Roo |
| 4,543,829 | A | 10/1985 | Lerch |
| 4,967,074 | A | 10/1990 | von Stein |
| 5,455,590 | A | 10/1995 | Collins et al. |
| 5,886,573 | A | 3/1999 | Kolanek |
| 6,167,245 | A | 12/2000 | Welland et al. |
| 6,517,866 | B1 | 2/2003 | Am Ende et al. |
| 6,977,502 | B1 | 12/2005 | Hertz |
| 7,158,072 | B1 | 1/2007 | Venkatachalam et al. |
| 11,158,942 | B1 | 10/2021 | Scott et al. |
| 2005/0068212 | A1 | 3/2005 | Jensen |
| 2005/0215213 | A1 | 9/2005 | Toporski |
| 2007/0041481 | A1 | 2/2007 | Malkemes et al. |
| 2007/0054698 | A1 | 3/2007 | Ding et al. |
| 2007/0149251 | A1 | 6/2007 | Jeon |
| 2008/0081675 | A1 | 4/2008 | Pinder |
| 2008/0308548 | A1 | 12/2008 | Fish et al. |
| 2009/0163161 | A1 | 6/2009 | Robinson et al. |
| 2009/0174822 | A1 | 7/2009 | Pugel |
| 2010/0150275 | A1 | 6/2010 | Dubash et al. |
| 2010/0151811 | A1 | 6/2010 | Sheikh-Movahhed et al. |
| 2010/0177760 | A1 | 7/2010 | Cannon et al. |
| 2011/0081880 | A1 | 4/2011 | Ahn |
| 2011/0206163 | A1 | 8/2011 | Lowdermilk et al. |
| 2011/0280313 | A1 | 11/2011 | Stocks et al. |
| 2012/0128099 | A1 | 5/2012 | Morris et al. |
| 2013/0060527 | A1 | 3/2013 | Martin |
| 2013/0070875 | A1* | 3/2013 | Kuan .................. H04B 1/0021 375/340 |
| 2014/0198689 | A1 | 7/2014 | Loh et al. |
| 2014/0270008 | A1 | 9/2014 | Goodson et al. |
| 2015/0009795 | A1 | 1/2015 | Gray et al. |
| 2015/0200679 | A1 | 7/2015 | Stein et al. |
| 2017/0085408 | A1 | 3/2017 | Yensen et al. |
| 2017/0111155 | A1 | 4/2017 | Liu et al. |
| 2017/0347305 | A1 | 11/2017 | Abraha et al. |
| 2018/0041875 | A1 | 2/2018 | Saig |
| 2018/0131575 | A1 | 5/2018 | He et al. |
| 2018/0139802 | A1 | 5/2018 | Hori et al. |
| 2018/0167194 | A1 | 6/2018 | Luo et al. |
| 2019/0007080 | A1 | 1/2019 | Manian et al. |
| 2019/0013795 | A1 | 1/2019 | Tangudu et al. |
| 2019/0123791 | A1 | 4/2019 | Luo et al. |
| 2019/0158134 | A1 | 5/2019 | Espana Fresno |
| 2023/0261700 | A1* | 8/2023 | Grynewicz .............. H03L 7/22 375/267 |

FOREIGN PATENT DOCUMENTS

| | | | |
|---|---|---|---|
| CN | 101707473 | A | 5/2010 |
| CN | 101827055 | A | 9/2010 |
| CN | 101917781 | A | 12/2010 |
| CN | 102082597 | A | 6/2011 |
| CN | 102647197 | A | 8/2012 |
| CN | 102739262 | A | 10/2012 |
| CN | 102882814 | A | 1/2013 |
| CN | 102928665 | A | 2/2013 |
| CN | 102928852 | A | 2/2013 |
| CN | 204392257 | U | 6/2015 |
| CN | 105278404 | A | 1/2016 |
| CN | 105354397 | A | 2/2016 |
| CN | 205880226 | U | 1/2017 |
| CN | 106533472 | A | 3/2017 |
| CN | 106814353 | A | 6/2017 |
| CN | 106972832 | A | 7/2017 |
| CN | 108134638 | A | 6/2018 |
| CN | 108631809 | A | 10/2018 |
| CN | 109373942 | A | 2/2019 |
| CN | 111181892 | A | 5/2020 |
| CN | 111211798 | A | 5/2020 |
| CN | 111212007 | A | 5/2020 |
| CN | 111220951 | A | 6/2020 |
| CN | 112910475 | A | 6/2021 |
| CN | 113098502 | A | 7/2021 |
| CN | 113114166 | A | 7/2021 |
| CN | 113238261 | A | 8/2021 |
| CN | 113541623 | A | 10/2021 |
| CN | 215498938 | U | 1/2022 |
| DE | 1 537 061 | A1 | 4/1970 |
| DE | 25 34 395 | C1 | 12/1987 |
| DE | 10 2010 019 058 | A1 | 11/2011 |
| EP | 1 305 887 | B1 | 9/2005 |
| EP | 3 832 890 | A1 | 6/2021 |
| GB | 588851 | A | 6/1947 |
| GB | 886421 | A | 1/1962 |
| JP | 2006-292710 | A | 10/2006 |
| KR | 100675328 | B1 | 1/2007 |
| NO | 9900612 | A * | 8/1999 ............ G01H 9/004 |
| RU | 137 168 | U1 | 1/2014 |
| SU | 1040353 | A1 | 9/1983 |
| WO | 2012/051936 | A1 | 4/2012 |
| WO | 2017/012941 | A1 | 1/2017 |
| WO | 2020/073345 | A1 | 4/2020 |

* cited by examiner

RADIO FREQUENCY RECEIVER AND OPERATION METHOD THEREOF

The present disclosure relates to a radio frequency receiver, and more particularly, to a radio frequency receiver that is able to perform uninterrupted observation of all signals within an operating frequency range of the receiver.

Generally, modern receivers, e.g. a super-heterodyne receiver, comprise a tuner that mixes a part of the frequency range of the receiver to an intermediate frequency. The analog intermediate frequency signal is then digitized in whole or in part by means of an analog-to-digital converter. The resulting digitized intermediate frequency signal is then available at the output of the analog-to-digital converter. If two or more signals to be examined are within the digital intermediate frequency bandwidth, they can be selected and be analyzed using digital downconverters, especially without having to adjust the reception frequency of the receiver. However, if the signals to be examined are farther apart than the digital intermediate frequency bandwidth, uninterrupted observation is not possible. In this case, especially to observe said signals at least sequentially, scanning or searching operations are provided.

For example, US 2011/0280313 A1 discloses a radio frequency receiver being scannable over a plurality of different frequencies. However, an uninterrupted operation cannot be possible since the receiver of US 2011/0280313 A1 may either be locked to a current frequency or may scan to a next frequency based on, e.g. a received power level. The disadvantage of such a scan is that the properties of a signal can only be captured insufficiently or pulsed or burst-like signals cannot be captured at all or only partially.

In view of the above, embodiments of this disclosure aim to provide an improved radio frequency receiver and operation method. An objective is to provide an uninterrupted radio frequency observation scheme of all or most of the frequencies within the operating frequency range of the receiver, especially for addressing the above-mentioned limitations.

These and other objectives are achieved by the embodiments of this disclosure as described in the enclosed independent claims. Advantageous implementations of the embodiments are further defined in the dependent claims.

According to a first aspect of this disclosure, a radio frequency receiver is provided. The radio frequency receiver comprises at least one antenna, at least one splitter configured to receive an analog input signal from the at least one antenna and to split the analog input signal into at least two analog signals corresponding to at least two frequency bands within an operating frequency range of the receiver, and a signal conversion block operably coupled to the at least one splitter, configured to receive the at least two analog signals simultaneously or quasi-simultaneously. In this regard, the signal conversion block comprises at least two analog-to-digital converters configured to digitize the respective at least two analog signals, thereby generating at least two digitized signals.

Furthermore, the signal conversion block comprises at least two digital down converters respectively coupled to the at least two analog-to-digital converters, configured to operate on at least one of the at least two frequency bands and further to down convert the respective at least two digitized signals. Advantageously, all or most of the sub-bands within the operating frequency range of the receiver can be digitized, and therefore are available for digital signal processing, which facilitates an uninterrupted operation of the receiver.

In an implementation form of the first aspect, the at least two analog-to-digital converters are configured to digitize the respective at least two analog signals simultaneously or quasi-simultaneously. Additionally or alternatively, the at least two digital down converters are configured to down convert the respective at least two digitized signals simultaneously or quasi-simultaneously. Advantageously, the simultaneous or quasi-simultaneous digitization of all or most of the sub-bands facilitates a simultaneous or quasi-simultaneous observation of the sub-bands within the operating frequency range of the receiver.

In an implementation form of the first aspect, the signal conversion block further comprises at least one switching matrix configured to couple the at least two digital down converters to the at least two analog-to-digital converters. In this regard, the at least one switching matrix is configured to couple the at least two digital down converters to the at least two analog-to-digital converters via a plurality of switching sequences. Furthermore, the at least one switching matrix is configured to execute the plurality of switching sequences in an arbitrary manner or in a pre-defined manner. Advantageously, the digital downconverters may be assigned to the analog-to-digital converters in an arbitrary manner or in a pre-defined manner, which facilitates an arbitrary or selective switching between the analog signal paths and the digital processing paths.

In an implementation form of the first aspect, at least one of the at least two digital down converters is configured to operate at a fixed frequency and/or bandwidth. Additionally or alternatively, at least one of the at least two digital down converters is configured to operate at a variable frequency and/or bandwidth. For instance, a center frequency and/or bandwidth of the digital downconverter may be kept constant or be changed as required. By having the digital downconverter set to a particular frequency and/or bandwidth, a fixed operation mode is advantageously facilitated. In addition, by operating the digital downconverter with a variable frequency and/or bandwidth, a scanning operation mode is advantageously facilitated. The simultaneous or quasi-simultaneous digitization of all or most of the sub-bands and the provision for operating the digital downconverters in the fixed operation mode and in the scanning operation mode result in the synergistic effect of simultaneous or quasi-simultaneous operation of fixed frequency and scanning modes on all or most of the sub-bands within the operating frequency range.

In an implementation form of the first aspect, at least one of the at least two digital down converters comprises at least one digital mixer and at least one digital bandpass filter, whereby the at least one digital bandpass filter is configured to pass at least one of the at least two frequency bands. Advantageously, band-specific operations of the digital downconverters are facilitated and are secured.

In an implementation form of the first aspect, the radio frequency receiver further comprises at least one processor operably coupled to the signal conversion block, configured to control parameterization of the at least two digital down converters, especially to match at least one of the at least two frequency bands. The parameterization of the digital downconverters may comprise but not limited to a definition and/or control of a center frequency of the digital downconverters, a definition and/or control of an operation bandwidth of the digital downconverters, or a combination thereof. In addition, the at least one processor is configured to operate the at least one switching matrix to couple the at least two digital down converters to the at least two analog-to-digital converters. In this regard, the processor may configure the switching matrix to execute a pre-defined or pre-coded or pre-stored switching sequence or a random switching sequence or a real-time generated switching sequence, i.e. interactive switching and real-time continuous control of the switching matrix.

In an implementation form of the first aspect, the radio frequency receiver comprises at least one digital interface, preferably a high speed digital interface. The digital interface may comprise or is a standard digital interface such as but not limited to a double data rate (DDR) interface, a peripheral component interconnect express (PCIe), a universal serial bus (USB), and a high-definition multimedia interface (HDMI).

In an implementation form of the first aspect, the operating frequency range of the receiver is a wideband radio frequency range, preferably in the range of 20 MHz to 100 GHz, more preferably in the range of 20 MHz to 40 GHz, most preferably in the range of 20 MHz to 18 GHz.

According to a second aspect of this disclosure, a method is provided. The method comprises the steps of splitting, by at least one splitter, an incoming analog input signal into at least two analog signals corresponding to at least two frequency bands within an operating frequency range, receiving, by a signal conversion block, the at least two analog signals simultaneously or quasi-simultaneously, digitizing the at least two analog signals by respective at least two analog-to-digital converters, thereby generating at least two digitized signals, and down converting the at least two digitized signals by respective at least two down converters, whereby operating the at least two down converters on at least one of the at least two frequency bands.

According to a third aspect of this disclosure, a computer program is provided with program code means and/or comprises instructions in order to proceed with all steps of the method according to the second aspect and/or any implementation form thereof if the computer program runs on a computer or a digital signal processor.

It is to be noted that the method according to the second aspect corresponds to the radio frequency receiver according to the first aspect and its implementation forms. Accordingly, the method of the second aspect may have corresponding implementation forms. Further, the method of the second aspect achieves the same advantages and effects as the radio frequency receiver of the first aspect and its respective implementation forms.

The above described aspects and implementation forms will be explained in the following description of specific embodiments in relation to the enclosed drawings, in which.

Reference will now be made in detail to the embodiments of the present disclosure, examples of which are illustrated in the accompanying drawings. However, the following embodiments of the present disclosure may be variously modified and the range of the disclosure is not limited by the following embodiments. Reference signs for similar entities in different embodiments are partially omitted.

Figure 1:
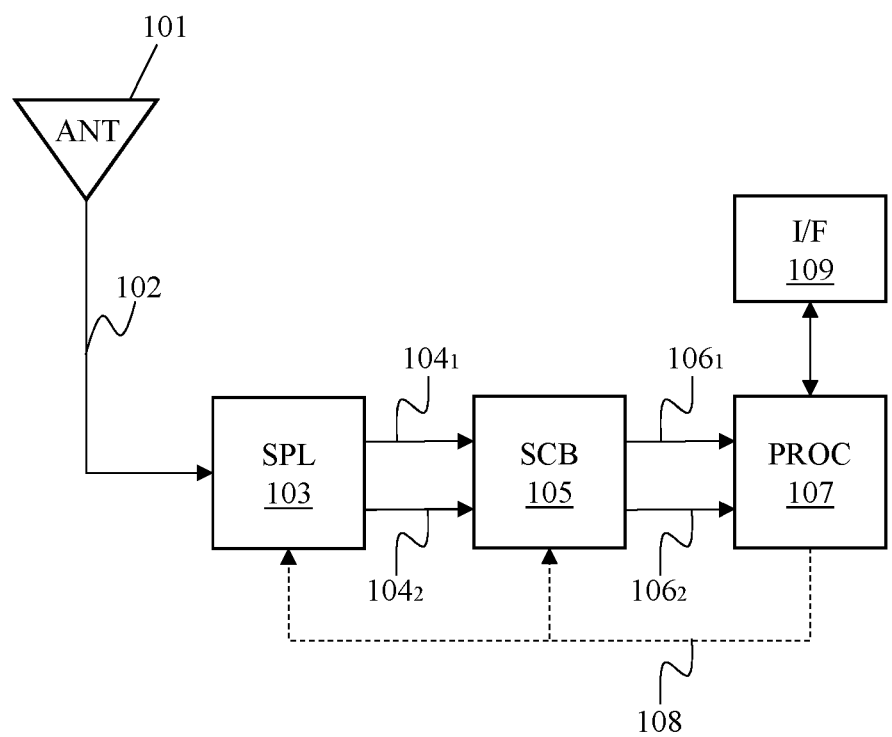
FIG. 1 shows an exemplary block representation of a radio frequency receiver according to an embodiment of this disclosure.

In FIG. 1, an exemplary block representation of a radio frequency receiver 100 according to the first aspect of this disclosure is illustrated. The radio frequency receiver 100 comprises an antenna (ANT) 101, e.g. a wideband or a broadband antenna, configured to operate over a very wide passband, especially defined by a target or an operating frequency range of the radio frequency receiver 100, and to provide an incoming analog input signal 102 towards the receiver components. In addition, the radio frequency receiver 100 comprises a splitter (SPL) 103, e.g. a frequency splitter or a frequency band splitter or a frequency divider, configured to receive the incoming analog input signal 102 from the antenna 101 and to split the analog input signal 102 into at least two analog signals corresponding to at least two frequency bands, herein exemplarily shown as two analog input signals $104_1$ and $104_2$.

The radio frequency receiver 100 further comprises a signal conversion block (SCB) 105 configured to receive the two analog input signals $104_1$ and $104_2$ from the splitter 103 simultaneously or quasi-simultaneously. The term "quasi-simultaneous" can be understood for at least two occurrences or instants as the at least two occurrences or instants may have no appreciable delay between them. As such, the signal conversion block 105 may simultaneously or quasi-simultaneously process or convert the two analog signals $104_1$ and $104_2$.

In this regard, the signal conversion block 105 comprises at least two analog-to-digital converters (not shown) and at least two corresponding digital downconverters (not shown), exemplarily two respective analog-to-digital converters and corresponding two digital downconverters for the two analog input signals $104_1$ and $104_2$, especially to perform domain conversion and frequency conversion on the two analog input signals $104_1$ and $104_2$ respectively, thereby generating at least two converted signals, e.g. two converted signals $106_1$ and $106_2$ exemplarily shown herein from the two analog input signals $104_1$ and $104_2$ either respectively or interchangeably.

The radio frequency receiver 100 further comprises a processor (PROC) 107 configured to receive the two converted signals $106_1$ and $106_2$ from the signal conversion block 105, especially simultaneously or quasi-simultaneously, and to perform further signal processing on the two converted signals $106_1$ and $106_2$ to analyze the signals and/or signal traits. The processor 107 may comprise one or more application specific integrated circuits (ASICs), digital signal processors (DSPs), digital signal processing devices (DSPDs), programmable logic devices (PLDs), field programmable gate arrays (FPGAs), microcontrollers, or the like. The processor 107 is further configured to provide control commands to the splitter 103 and to the signal conversion block 105, e.g. shown as dashed signal lines 108.

The radio frequency receiver 100 moreover comprises an interface (I/F) 109, e.g. a digital interface and/or a high speed digital interface, operably coupled to the processor 107. The interface 109 may couple the processor 107 to a memory or storage, e.g. a data storage, and/or to a display and/or to an input/output device and/or to a further processor and/or to a network. The interface 109 may comprise provisions for wireless and/or wired communication.

Figure 2:
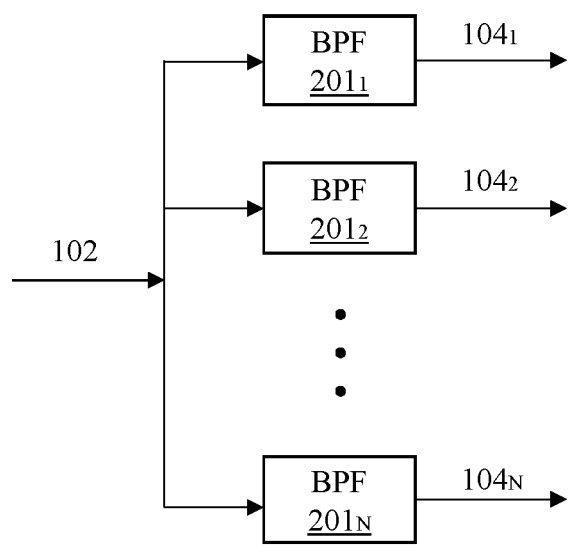
FIG. 2 shows an exemplary block representation of a splitter according to an embodiment of this disclosure.

In FIG. 2, an exemplary block representation of the splitter 103 is illustrated. The splitter 103 comprises at least two, preferably more than two, most preferably a number of N bandpass filters (BPF) $201_1$-$201_N$, collectively referred to as bandpass filters 201. In other words, the splitter 103 may provide a number of N band-limited channels, i.e. channels with defined finite respective bandwidths. Additionally or alternatively, the splitter 103 may comprise one or more low-pass filters to pass the edge frequencies at the lower-side band of the operating frequency range and/or one or more high-pass filters to pass the edge frequencies at the higher-side band of the operating frequency range.

Preferably, the splitter 103 is coupled to the antenna 101, e.g. through one or more couplers, and receives the analog input signal 102 from the antenna 101. Accordingly, the splitter 103 splits or divides the analog input signal 101 corresponding to a number of N frequency bands over the number of N band-limited channels comprising the respective bandpass filters 201. This results in a number of N analog signals $104_1$-$104_N$, collectively referred to as analog signals 104, corresponding to the bandpass filters $201_1$-$201_N$.

Preferably, one or more bandpass filters 201 are controllable, i.e. the filter parameters of one or more bandpass filters 201 are controllable. For example, the processor 107 may control the one or more bandpass filters 201 by providing control signals through the signal line 108.

Furthermore, the splitter 103 may additionally comprise one or more radio frequency amplifiers, e.g. power amplifiers, low noise amplifiers, or a combination thereof, in order to pre-process the input analog signal 102. Alternatively, the radio frequency amplifiers may be implemented as an external amplification block between the antenna 101 and the splitter 103, i.e. along the antenna feed towards the splitter 103. Furthermore, one or more of the N band-limited channels may comprise one or more radio frequency amplifiers, e.g. band-limited amplifiers, especially coupled to the respective bandpass filters 201.

Figure 3:
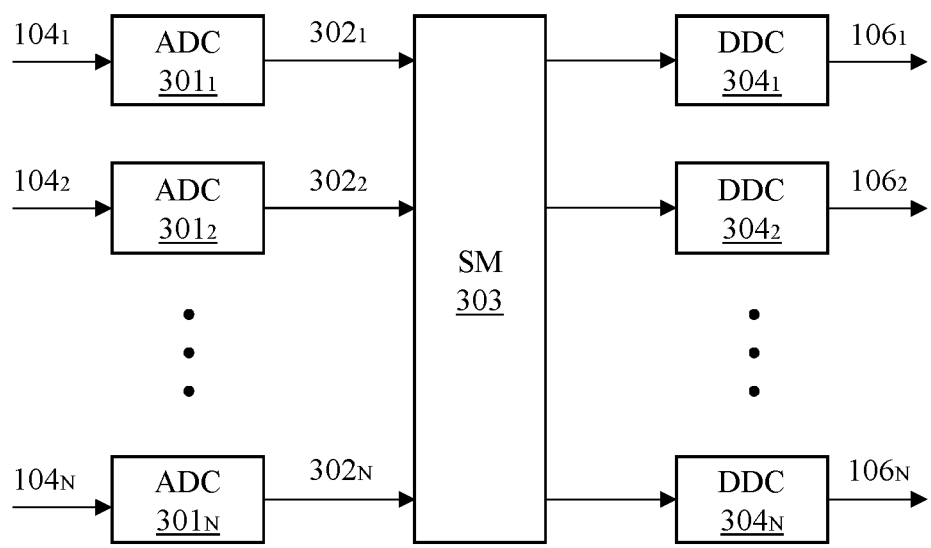
FIG. 3 shows an exemplary block representation of a signal conversion block according to an embodiment of this disclosure.

In FIG. 3, an exemplary representation of the signal conversion block 105 is illustrated. The signal conversion block 105 comprises at least two, preferably more than two, most preferably a number of N analog-to-digital converters (ADC) $301_1$-$301_N$, collectively referred to as analog-to-digital converters 301, especially configured to be coupled to the number of N band-limited channels of the splitter 103. As such, the analog-to-digital converters 301 respectively perform domain conversion on the analog signals 104, i.e. converting from analog domain to digital domain, thereby resulting in a number of N digitized signals $302_1$-$302_N$, collectively referred to as digital signals 302, corresponding to the analog signals 104. Preferably, the analog-to-digital converters 301 converts the analog signals 104 simultaneously or quasi-simultaneously. Further preferably, the analog-to-digital converters 301 are fast and/or low power analog-to-digital converters.

The signal conversion block 105 further comprises at least two, preferably more than two, most preferably a number of N digital downconverters (DDC) $304_1$-$304_N$, collectively referred to as digital downconverters 304, especially configured to be coupled to the number of N analog-to-digital converters 301. As such, the digital downconverters 304 respectively perform frequency conversion on the digital signals 302, i.e. converting one digital frequency range into another, especially lower digital frequency range, thereby resulting in a number of N converted signals $106_1$-$106_N$, collectively referred to as converted signals 106, corresponding to the digital signals 302. Preferably, the digital downconverters 304 converts the digital signals 302 simultaneously or quasi-simultaneously.

The digital downconverters 304 may be directly assigned to the respective analog-to-digital converters 301. Alternatively, the digital downconverters 304 may be assigned to the respective analog-to-digital converters 301 in a switchable manner in order to switch the respective signal paths between the digital signals 302 (corresponding to the respective analog signals 104) and the converted signals 106.

In this regard, the signal conversion block 105 comprises a switching matrix (SM) 303 configured to couple the digital downconverters 304 to the analog-to-digital converters 301. Preferably, the switching matrix 303 couples the digital downconverters 304 to the analog-to-digital converters 301 according to an arbitrary or a pre-defined switching sequence. More preferably, the switching matrix 303 is controllable, for example, the processor 107 may control the switching operation of the switching matrix 303 by providing control signals through the signal line 108. As such, the switching matrix 303 respectively receives the digital signals 302 from the analog-to-digital converters 301 and further conveys the digital signals 302 to the respective digital downconverters 304 in a switchable manner.

Figure 4:
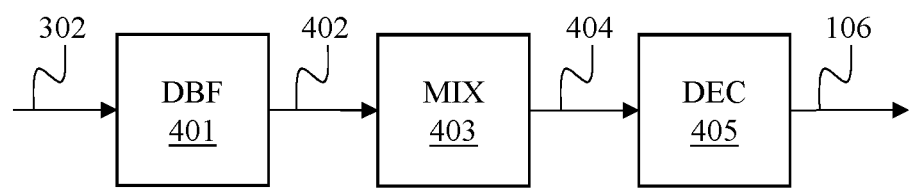
FIG. 4 shows an exemplary block representation of a digital downconverter according to an embodiment of this disclosure.

In FIG. 4, an exemplary block representation of the digital downconverter 304 is illustrated. The digital downconverter 304 comprises a digital bandpass filter (DBF) 401 configured to pass digitized signals within a specific frequency range, thereby resulting in a band-limited digitized signal 402. The digital downconverter 304 further comprises a digital mixer (MIX) 403 comprising a digital oscillator (not shown), e.g. a numerically controlled oscillator, configured to perform frequency translation on the band-limited digitized signal 402, e.g. from digital intermediate frequency bandwidth to digital baseband, thereby resulting in a translated digitized signal 404. The digital downconverter 304 moreover comprises a decimation block (DEC) 405, e.g. comprising a low-pass filter (not shown), configured to perform filtering and/or decimation on the translated digitized signal 404, thereby resulting in the converted signal 106.

Preferably, the digital downconverter 304 is controllable and/or configurable, i.e. at least one parameter such as the center frequency, the bandwidth, and the like of the digital downconverter 304 and/or of the digital bandpass filter 401 and/or of the digital mixer 403 and/or of the decimation block 405 is configurable. For example, the processor 107 may control the at least one parameter of the digital down converter 304 by providing control signals through the signal line 108. As such, the digital downconverter 304 is configurable, e.g. by means of selective parameterization by the processor 107, so as to be tuned to a specific frequency or to be varied in terms of operating frequency and/or bandwidth.

Figure 5:
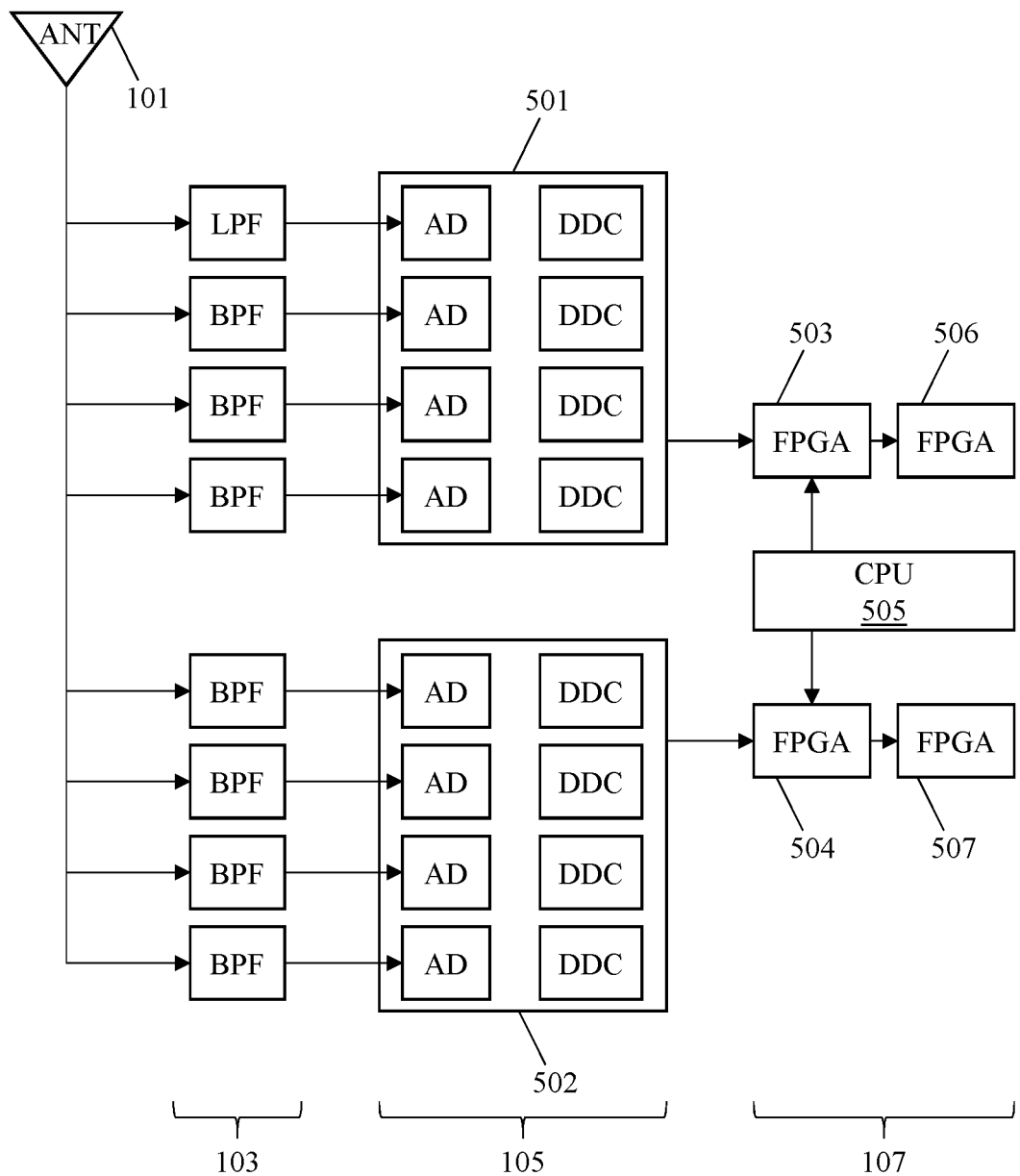
FIG. 5 shows an exemplary high-level block representation of the radio frequency receiver.

In FIG. 5, an exemplary high-level block representation of a radio frequency receiver 500 according to the first aspect of this disclosure is illustrated. The radio frequency receiver 500, especially the components of the radio frequency receiver 500 correspond to the components of the radio frequency receiver 100. Particularly, the radio frequency receiver 500 is exemplarily illustrated as a wideband receiver operating in the range of 20 MHz to 18 GHz.

The exemplary signal conversion block 105 is therefore divided into two segments, one 501 may operate in the range of 20 MHz to 8 GHz and the other 502 may operate in the range of 8 GHz to 18 GHz. Each of the two segments 501, 502 may comprise a plurality of analog-to-digital converters 301 and a plurality of respective digital downconverters 304, herein exemplarily illustrated with four analog-to-digital converters 301 and respective four digital downconverters 304. The digital downconverters 304 may be assigned to the analog-to-digital converters 301 directly or in a switchable manner, whereby the assignment of the respective digital downconverters 304 to the analog-to-digital converters 301 may be specific to one of the segments 501, 502 or may be distributed throughout the signal conversion block 105.

The splitter 103 may split or divide the analog input signal 102 from the antenna over a plurality of band-limited channels comprising a respective low-pass or bandpass filter, herein exemplarily illustrated with eight band-limited channels. The segments 501, 502 may be coupled to the respective band-limited channels, herein exemplarily each of the segments 501, 502 is coupled to four respective band-limited channels.

The processor 107 may comprise a central processing unit (CPU) 505, and a respective configurable logic blocks 503, 504, e.g. field programmable gate arrays (FPGA), corresponding to the respective segments 501, 502. The respective configurable logic blocks 503, 504 corresponding to the respective segments 501, 502 of the signal conversion block 105 may be extended to further configurable logic blocks 506, 507, e.g. further field programmable gate arrays (FPGA).

As such, the exemplary segment 501 of the signal conversion block 105 along with the respective band-limited channels of the splitter 103, and the configurable logic blocks 503, 506 may perform one or more fixed operation modes and/or one or more scanning operation modes in the wideband frequency range of 20 MHz to 8 GHz. Analogously, the exemplary segment 502 of the signal conversion block 105 along with the respective band-limited channels of the splitter 103, and the configurable logic blocks 504, 507 may perform one or more fixed operation modes and/or one or more scanning operation modes in the wideband frequency range of 8 GHz to 18 GHz.

Figure 6:
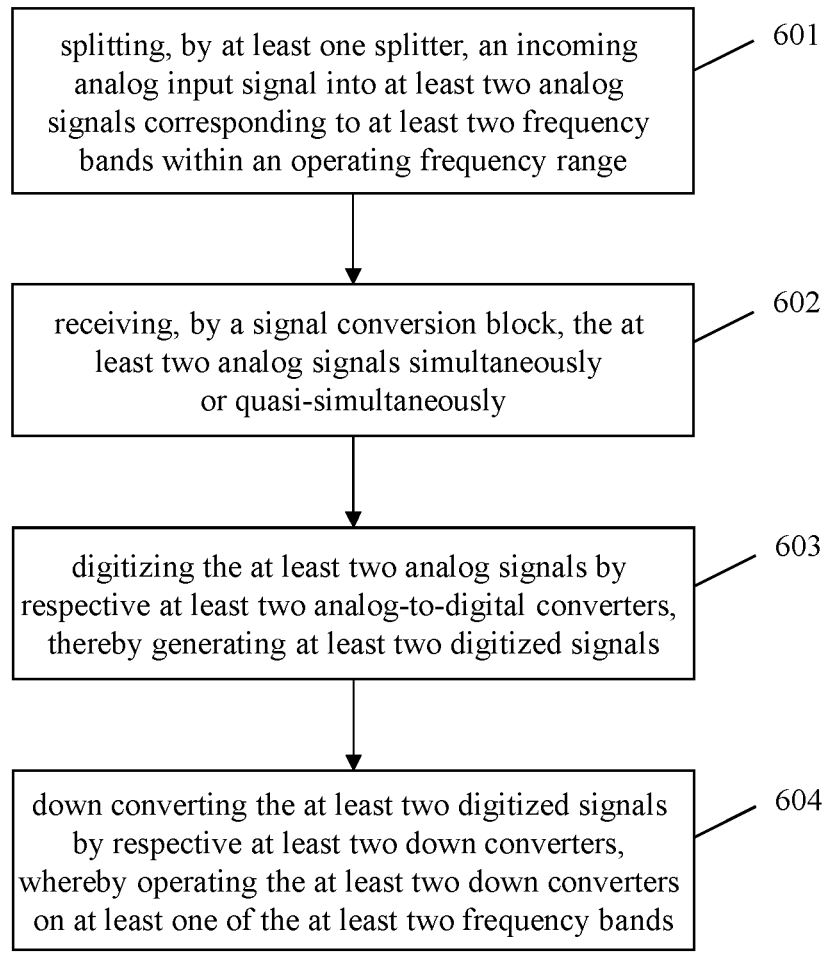
FIG. 6 shows an exemplary flow diagram of the method according to an embodiment of this disclosure.

In FIG. 6, an exemplary embodiment of the method 600 according to the second aspect of this disclosure is illustrated. In a first step 601, an incoming analog input signal is split by at least one splitter into at least two analog signals corresponding to at least two frequency bands within an operating frequency range. In a second step 602, the at least two analog signals are simultaneously or quasi-simultaneously received by a signal conversion block. In a third step 603, the at least two analog signals are digitized by respective at least two analog-to-digital converters, thereby generating at least two digitized signals. In a fourth step 604, the at least two digitized signals are down converted by respective at least two down converters, whereby operating the at least two down converters on at least one of the at least two frequency bands.

Therefore, the present disclosure discloses schemes to perform uninterrupted observation of all or most of the signals within an operating frequency range of radio frequency receivers, especially discloses schemes for digitization of the entire frequency range or a large part of it. Since the center frequency and bandwidth of each individual digital downconverter can be changed as desired or can be kept constant, a fixed operation mode and a scanning operation mode can be operated simultaneously or combined as desired, especially depending on the available number of digital downconverters.

Advantageously, the radio frequency receiver may perform the operation modes simultaneously due to the digitization of all signals of interest. For instance, a digital downconverter may perform a scan and the other digital downconverters may observe the detected signal without interruption. In addition, different types of scanning operation modes can also be executed simultaneously or quasi-simultaneously.

It is to be noted that the number of signals to be observed without interruption plus the number of scanning operation modes to be applied simultaneously must be less than or equal to the available number of digital downconverters. The detection probability of any signals in the entire frequency range is therefore only has a dependency on the computing power and the selected application, however independent of the hardware implemented in the analog reception train.

It is important to note that, in the description as well as in the claims, the word "comprising" does not exclude other elements or steps and the indefinite article "a" or "an" does not exclude a plurality. A single element or other unit may fulfill the functions of several entities or items recited in the claims. Furthermore, the word "coupled" implies that the elements may be directly connected together or may be coupled through one or more intervening elements. Moreover, the disclosure with regard to any of the aspects is also relevant with regard to the other aspects of the disclosure.

Although the disclosure has been illustrated and described with respect to one or more implementations, equivalent alterations and modifications will occur to others skilled in the art upon the reading and understanding of this specification and the annexed drawings. In addition, while a particular feature of this disclosure may have been disclosed with respect to only one of several implementations, such feature may be combined with one or more other features of the other implementations as may be desired and advantageous for any given or particular application.

The invention claimed is:
1. A radio frequency receiver comprising:
at least one antenna,
at least one splitter configured to receive an analog input signal from the at least one antenna and to split the analog input signal into at least two analog signals corresponding to at least two respective frequency bands within an operating frequency range of the radio frequency receiver,
a signal conversion block, operably coupled to the at least one splitter, configured to receive the at least two analog signals simultaneously or quasi-simultaneously, and
at least one processor operably coupled to the signal conversion block,
wherein the signal conversion block comprises at least two analog-to-digital converters configured to digitize the respective at least two analog signals, thereby generating at least two digitized signals,
wherein the signal conversion block further comprises at least two digital down converters, respectively coupled to the at least two analog-to-digital converters, configured to operate on at least one of the at least two frequency bands and further to down convert the respective at least two digitized signals,
wherein the signal conversion block further comprises at least one switching matrix coupled between the at least two analog-to-digital converters and the at least two digital down converters, the at least one switching matrix being configured to couple the at least two digital down converters to the at least two analog-to-digital converters in a switchable manner for switching between analog signal paths of the at least two analog-to-digital converters and digital processing paths of the at least two digital down converters,
wherein one of the at least two digital down converters is configured to operate at a fixed frequency and/or band- width and one of the at least two digital down converters is configured to operate at a variable frequency and/or bandwidth, and wherein the at least one processor is configured to define and/or control a center frequency and/or an operation bandwidth of the at least two digital down converters.

2. The radio frequency receiver according to claim 1, wherein the at least two analog-to-digital converters are configured to digitize the respective at least two analog signals simultaneously or quasi-simultaneously.

3. The radio frequency receiver according to claim 1, wherein the at least two digital down converters are configured to down convert the respective at least two digitized signals simultaneously or quasi-simultaneously.

4. The radio frequency receiver according to claim 1, wherein the at least one switching matrix is configured to couple the at least two digital down converters to the at least two analog-to-digital converters using a plurality of switching sequences.

5. The radio frequency receiver according to claim 4, wherein the at least one switching matrix is configured to execute the plurality of switching sequences in an arbitrary manner or in a pre-defined manner.

6. The radio frequency receiver according to claim 1, wherein at least one of the at least two digital down converters comprises at least one digital mixer and at least one digital bandpass filter, whereby the at least one digital bandpass filter is configured to pass at least one of the at least two frequency bands.

7. The radio frequency receiver according to claim 1, wherein the at least one processor is configured to control parameterization of the at least two digital down converters to match at least one of the at least two frequency bands.

8. The radio frequency receiver according to claim 7, wherein the at least one processor is configured to operate at least one switching matrix to couple the at least two digital down converters to the at least two analog-to-digital converters.

9. The radio frequency receiver according to claim 1, wherein the radio frequency receiver comprises at least one digital interface.

10. The radio frequency receiver according to claim 1, wherein the operating frequency range of the receiver is a wideband radio frequency range.

11. A method comprising:
    splitting, by at least one splitter, an incoming analog input signal into at least two analog signals corresponding to at least two respective frequency bands within an operating frequency range,
    receiving, by a signal conversion block, the at least two analog signals simultaneously or quasi-simultaneously,
    digitizing the at least two analog signals by respective at least two analog-to-digital converters, thereby generating at least two digitized signals,
    down converting the at least two digitized signals by respective at least two down converters being connected to the at least two analog-to-digital converters in a switchable manner for switching between analog signal paths of the at least two analog-to-digital converters and digital processing paths of the at least two digital down converters, whereby operating the at least two down converters on at least one of the at least two frequency bands,
    operating one of the at least two digital down converters at a fixed frequency and/or bandwidth,
    operating one of the at least two digital down converters at a variable frequency and/or bandwidth, and
    defining and/or controlling, by at least one processor, a center frequency and/or an operation bandwidth of the at least two digital down converters.

12. A non-transitory computer-readable storage medium carrying instructions that, when executed, cause at least one data processor to perform operations of claim 11.

* * * * *